(12) United States Patent
Jeong et al.

(10) Patent No.: US 11,607,861 B2
(45) Date of Patent: Mar. 21, 2023

(54) MATERIALS FOR FIRE PROTECTION

(71) Applicant: Morgan Korea Co., Ltd, Daegu (KR)

(72) Inventors: Seob Kyo Jeong, Gyeonggi-do (KR); Jeong Mo Shin, Daegu (KR); Jun Sik Lee, Daegu (KR); Dean Murray, Merseyside (GB)

(73) Assignee: Morgan Korea Co., Ltd, Daegu (KR)

( * ) Notice: Subject to any disclaimer, the term of this patent is extended or adjusted under 35 U.S.C. 154(b) by 299 days.

(21) Appl. No.: 16/765,733

(22) PCT Filed: Nov. 20, 2018

(86) PCT No.: PCT/GB2018/053351
§ 371 (c)(1),
(2) Date: May 20, 2020

(87) PCT Pub. No.: WO2019/102185
PCT Pub. Date: May 31, 2019

(65) Prior Publication Data
US 2020/0295332 A1    Sep. 17, 2020

(30) Foreign Application Priority Data

Nov. 22, 2017 (GB) ........................ 1719408

(51) Int. Cl.
*B32B 19/06* (2006.01)
*B32B 27/32* (2006.01)
(Continued)

(52) U.S. Cl.
CPC .............. *B32B 3/04* (2013.01); *B32B 15/20* (2013.01); *B32B 19/06* (2013.01); *B32B 27/32* (2013.01);
(Continued)

(58) Field of Classification Search
CPC .... B32B 3/04; B32B 3/08; B32B 5/02; B32B 5/022; B32B 5/028; B32B 5/26;
(Continued)

(56) References Cited

U.S. PATENT DOCUMENTS

2012/0321868 A1* 12/2012 Richardson, III ...... B32B 5/245
428/216
2015/0343736 A1* 12/2015 Kawka ................. B32B 27/286
428/212

FOREIGN PATENT DOCUMENTS

GB          2568688 B      12/2019
WO     2006028666 A2       3/2006
WO     2010123771 A1      10/2010

OTHER PUBLICATIONS

[NPL-1] "Microlite® AA Blankets", John Manville; Aug. 24, 2020; <https://www.jm.com/content/dam/jm/global/en/oem/aerospace/microlite-aa/JM_Microlite_AA_Data_Sheet.pdf>. (Year: 2020).*

(Continued)

*Primary Examiner* — David Sample
*Assistant Examiner* — Donald M Flores, Jr.
(74) *Attorney, Agent, or Firm* — Servilla Whitney LLC

(57) ABSTRACT

A composite material for fire protection comprises: a) an inorganic fibre core comprising inorganic fibres interlocked or entangled to form a coherent body resistant against separation laminated between b) at least two layers of phyllosilicate insulation the material further comprising a barrier integral to the material to hinder ingress of humidity to edges of the inorganic fibre core.

20 Claims, 4 Drawing Sheets

(51) Int. Cl.
  *B32B 3/04*     (2006.01)
  *B32B 29/02*    (2006.01)
  *B32B 15/20*    (2006.01)
  *H01M 50/44*    (2021.01)
  *H01M 50/457*   (2021.01)
  *H01M 50/40*    (2021.01)
  *H01M 50/00*    (2021.01)
  *H01M 50/409*   (2021.01)

(52) U.S. Cl.
  CPC ............. *B32B 29/02* (2013.01); *H01M 50/44* (2021.01); *H01M 50/457* (2021.01); *B32B 2255/26* (2013.01); *B32B 2260/021* (2013.01); *B32B 2260/046* (2013.01); *B32B 2262/101* (2013.01); *B32B 2307/3065* (2013.01); *B32B 2307/7246* (2013.01); *B32B 2457/10* (2013.01); *H01M 50/00* (2021.01); *H01M 50/40* (2021.01); *H01M 50/409* (2021.01); *Y10T 428/13* (2015.01); *Y10T 428/1303* (2015.01); *Y10T 428/1352* (2015.01); *Y10T 428/1369* (2015.01); *Y10T 428/1372* (2015.01)

(58) Field of Classification Search
  CPC ......... B32B 9/002; B32B 9/047; B32B 15/20; B32B 17/02; B32B 18/00; B32B 19/06; B32B 27/32; B32B 29/02; B32B 2255/00; B32B 2255/26; B32B 2260/021; B32B 2260/046; B32B 2262/10; B32B 2262/101; B32B 2262/108; B32B 2264/104; B32B 2307/3065; B32B 2307/7246; B32B 2307/7265; B32B 2315/10; B32B 2457/00; B32B 2457/10; F16L 59/029; H01M 50/431; H01M 50/44; H01M 50/449; H01M 50/457; Y02E 60/10; Y10T 428/13; Y10T 428/1303; Y10T 428/1352; Y10T 428/1369; Y10T 428/1372

See application file for complete search history.

(56) References Cited

OTHER PUBLICATIONS

[NPL-2] "Superwool® Blanket", Morgan Advanced Materials; Feb. 2016; <https://www.lynnmfg.com/wp-content/uploads/data/DATA-TC-1114-105.pdf> (Year: 2016).*

* cited by examiner

MATERIALS FOR FIRE PROTECTION

CROSS-REFERENCE TO RELATED APPLICATIONS

This application is the National Stage entry of PCT/GB2018/053351, filed on Nov. 20, 2018, which claims priority to U.S. Provisional application Ser. No. 1719408.5, filed Nov. 22, 2017, the entire disclosures of which are hereby incorporated by reference herein.

This invention relates to materials for fire protection. The materials of the present invention are particularly useful for providing passive fire protection to prevent thermal runaway in electrical storage devices, for example in electric vehicle power assemblies, however the present invention is not limited to use in such assemblies.

Electrical storage devices may, for example, comprise a plurality of cells or batteries (e.g. lithium ion cells). Lithium ion cells may fail in operation, and this can result in an uncontrolled release of stored energy from a failing cell that can create localized areas of very high temperatures. For example, various types of cells have been shown to produce temperatures in the region of 600-900° C. in so-called "thermal runaway" conditions.

Such high temperatures may ignite adjacent combustibles, thereby creating a fire hazard. Elevated temperature may also cause some materials to begin to decompose and generate gas. Gases generated during such events can be toxic and/or flammable, further increasing the hazards associated with thermal runaway events.

Lithium ion cells may use organic electrolytes that have high volatility and flammability. Such electrolytes tend to start breaking down at temperatures starting in the region 150° C. to 200° C. and in any event have a significant vapour pressure even before break down starts. Once breakdown commences the gas mixtures produced (typically a mixture of $CO_2$, $CH_4$, $C_2H_4$, $C_2H_5F$ and others) can ignite. The generation of such gases on breakdown of the electrolyte leads to an increase in pressure and the gases are generally vented to atmosphere; however this venting process is hazardous as the dilution of the gases with air can lead to formation of an explosive fuel-air mixture that if ignited can flame back into the cell in question igniting the whole arrangement.

The issue of thermal runaway becomes compounded in devices comprising a plurality of cells, since cells adjacent to a failing cell may absorb enough energy from the failing cell to rise above their designed operating temperatures, and so be triggered to enter into thermal runaway. This can result in a chain reaction in which cells enter into a cascading series of thermal runaways, as one cell ignites adjacent cells.

Insulation materials comprising ceramic fibre papers laminated between mica paper sheets are known for use in insulation of furnaces, but are not known to be used for fire protection.

However specific requirements for providing fire protection for electric vehicle power assemblies may include one or more of the following:
  a low electrical conductivity to prevent shorting (e.g. preferably less than $1.0 \times 10^{-13}$ S/cm and more preferably less than $1.0 \times 10^{-14}$ S/cm).
  resistance to humidity
  appropriate compression characteristics to meet the specific design of electric vehicle power assembly
  freedom from silicones to permit end of life recycling.

In a first aspect of the present invention, there is provided composite material comprising:
  a) an inorganic fibre core comprising inorganic fibres interlocked or entangled to form a coherent body resistant against separation laminated between
  b) at least two layers of phyllosilicate insulation the material further comprising
  c) a barrier integral to the material to hinder ingress of humidity to edges of the inorganic fibre core.

The moisture uptake (when the sample is exposed to an environment of 40° C., 95% relative humidity for 23 hours) of the sealed inorganic fibre core layer is preferably less than 5 wt %, more preferably less than 4 wt %, even more preferably less than 3 wt % and most preferably less than 2.5 wt %.

In addition to the sealed edges of the inorganic fibre core layer preventing moisture ingress, the sealed edges also prevent dust formation within the inorganic core layer from being expelled into the environment.

The present invention provides a composite material and the use of the composite material as set out in the appended claims. In the claims, the term "phyllosilicate insulation" means a material or materials comprising one or more phyllosilicate minerals in an amount greater than 5% by weight of the material (and optionally >10%, >20%, >30%, >40%, >50%, >60%, >70%, or >80% by weight of the insulation material). The phyllosilicate insulation may comprise other components, including, as non-limitative examples, fillers and/or binders and/or fibres.

The invention is illustrated but not limited by the following description with reference to the drawings in which.

Figure 1:
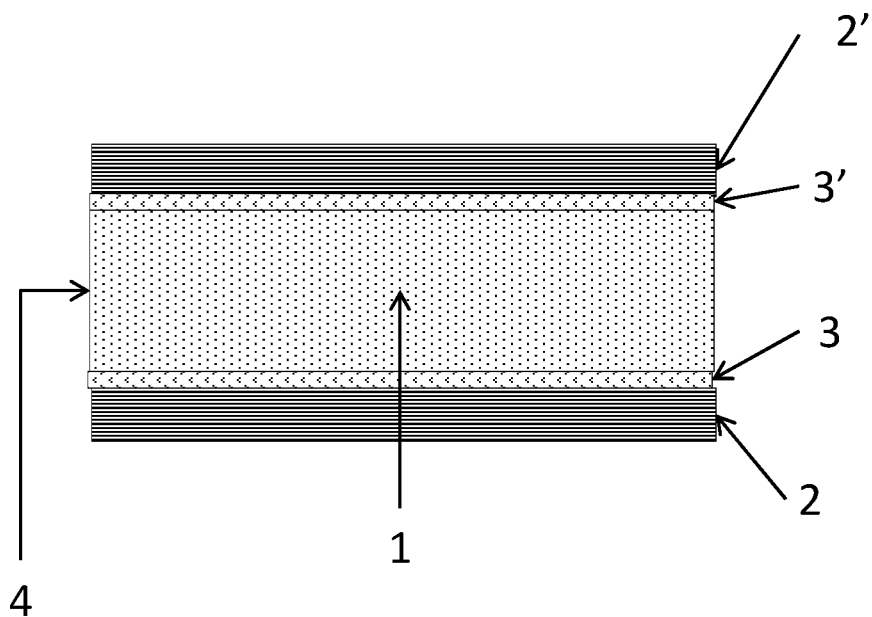
FIG. 1 shows schematically a paper/mica sheet as is conventionally known.

The conventional mica sheet of FIG. 1 is a laminate comprising a inorganic fibre core 1 sandwiched between mica paper sheets 2, 2' which optionally include scrim layers 3, 3' providing mechanical integrity to the mica paper sheets. The layers of the laminate are secured adhesively. Such a laminate provides free edges 4 of the inorganic fibre core that may act as a path for humidity or liquids to enter the laminate. Humidity and liquids can result in damage to the paper, and to reducing the electrical resistivity of the paper. The thickness of the mica paper sheets is preferably at least 0.06 mm, for example between 0.06 mm and 0.25 mm, with a minimum areal density of 100 g/m² to enable the sheet to provide a sufficient barrier to prevent moisture ingress enabling the sealant to be localised to the free edges 4. This provides the advantage of reducing the extent of sealant required, thereby reducing weight and size of the composite material.

Figure 2:
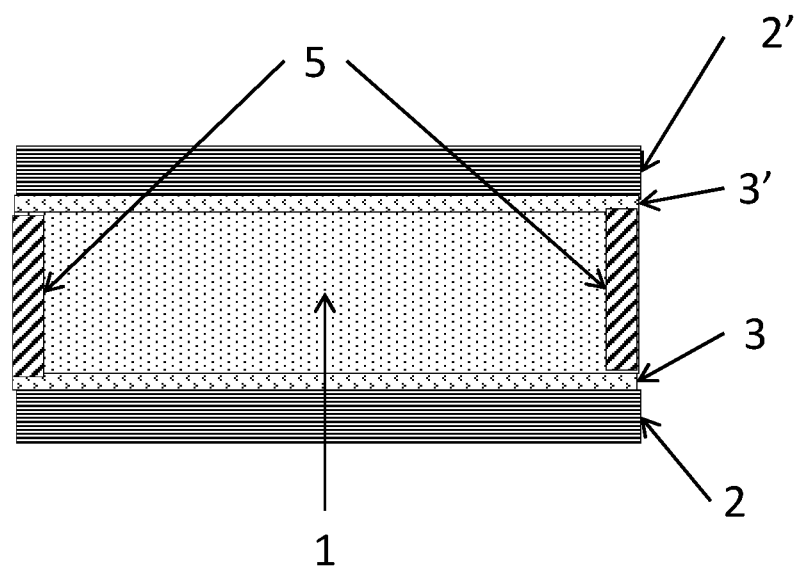
FIG. 2 shows schematically a paper/mica sheet as in a first embodiment of the present invention.

In a first embodiment shown in FIG. 2, and using the same references for like integers as FIG. 1, a sealant 5 is impregnated into the edges of the inorganic fibre core 1 reducing or eliminating ingress of humidity or liquid.

Figure 3:
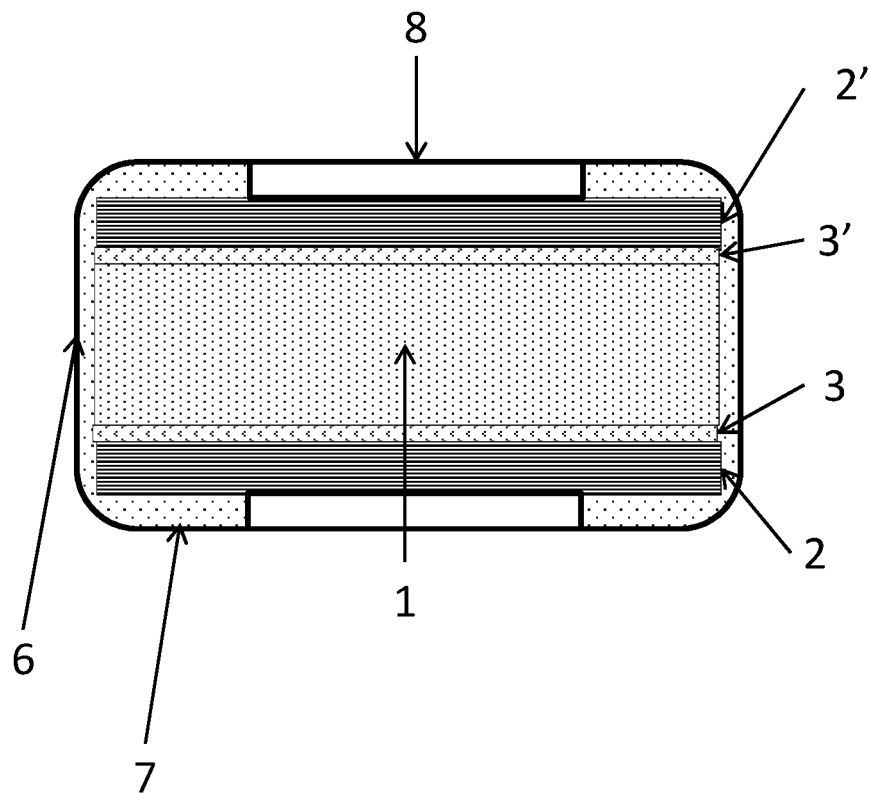
FIG. 3 shows schematically a paper/mica sheet as in a second embodiment of the present invention.

In a second embodiment shown in FIG. 3, and using the same references for like integers as FIG. 1, a protective coat 6 adheres to the face of the laminate and surrounds at least the edges 7 of the laminate of inorganic fibre core 1 and mica paper sheets 2, 2'. The protective coat 6 may optionally be omitted from regions 8 of the face of the laminate.

Figure 4:
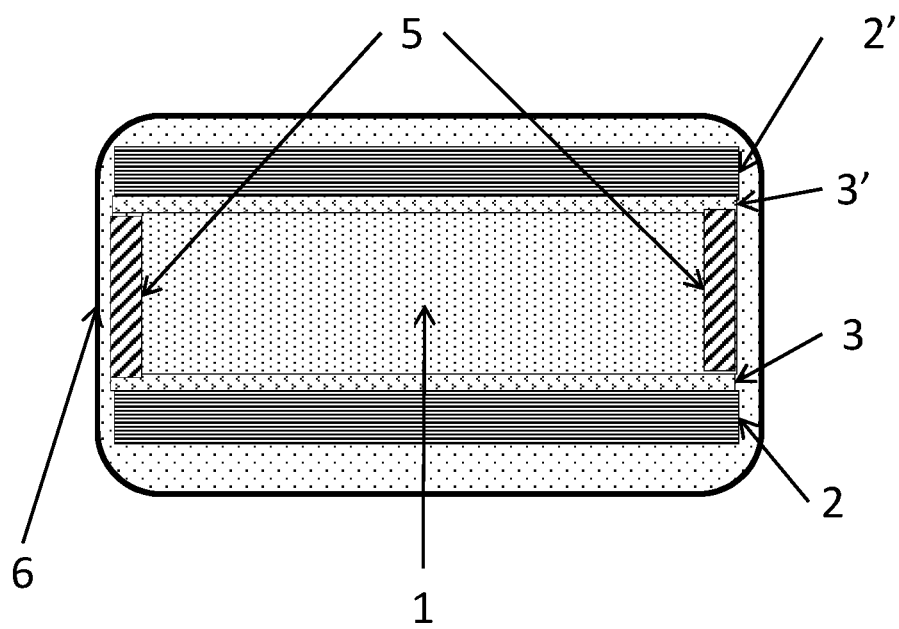
FIG. 4 shows schematically a paper/mica sheet as in a third embodiment of the present invention.

In a third embodiment shown in FIG. 4, and using the same references for like integers as FIG. 1, a sealant 5 is impregnated into the edges of the inorganic fibre core 1 reducing or eliminating ingress of humidity or liquid; and a protective coat 6 surrounds the laminate of inorganic fibre core 1 and mica paper sheets 2, 2'.

In more (but not limiting) detail:

The inorganic fibre core 1 comprises inorganic fibres interlocked or entangled to form a coherent body resistant against separation, but having sufficient spaces between the fibres to provide a thermal insulation effect, and a degree of compressibility. The inorganic fibres may be interlocked or entangled by any known means, for example by deposition as non-woven material, or by needling or otherwise entangling fibres from a fleece to form a blanket. However a particularly useful form is as a paper, formed from the inorganic fibres by paper making techniques.

The inorganic fibres may be of any type sufficient to provide the insulative and fire-resistant properties required, and typically will be of a fibre having a melting point above 1000° C. suitable fibres include (without limitation), aluminosilicate fibres, alkaline earth silicate fibres, alkali metal aluminosilicate fibres.

The inorganic fibre core 1 has a ceramic has a thickness greater than 0.5 mm to provide some scope for compressibility and resilience to deformation. This assists both in the assembly of products using the composite, and in providing a degree of cushioning for products protected by the composite. The maximum thickness of the inorganic fibre core 1 depends upon application and maintaining integrity of the composite, but is typically less than 10 cm, less than 5 cm, or less than 1 cm. Preferably, the density of the core is in the range of 200 to 280 kg/m$^3$ and more preferably 220 to 250 kg/m$^3$.

An example material that can be used is SUPERWOOL® PLUS alkaline earth silicate paper which is available in thicknesses including 2 mm, 3 mm and 6 mm. This material has a loss in ignition of about 8% by weight, and the present invention contemplates inorganic fibre cores in which the inorganic fibres comprise as little as 50% by weight of the inorganic fibre cores, but preferably the amount of inorganic fibre is >60%, >70%, >80%, >90% or even >95% of the inorganic fibre core. In addition to fibres, the inorganic fibre cores may comprise other materials as fillers, binders, or otherwise.

The mica paper sheets 2, 2' and optional scrim layers 3, 3' may be of any material appropriate to the functions of providing a fire barrier and mechanical integrity. A suitable material is a 0.1 mm thick mica paper with a glass cloth backing. Such paper/scrim materials typically have a resin binder present. The resin binder may be ready cured (in which case adhesive securing of the paper/scrim material to the inorganic fibre core 1 is required) or the paper/scrim material may be an uncured prepreg (for curing of the resin during direct lamination of the with the inorganic fibre core 1).

Preferably the areal density of the mica paper is in the range of 100 to 150 g/m$^2$. Suitable materials are supplied by SWECO Inc. [www.swecomica.net/eng/]. Mica paper sheets typically have a density of up to around 1300 kg.m$^{-3}$ but the density varies with the relative proportions of paper and backing. The invention is not limited to any particular density.

It is preferable for some applications that that the mica paper sheets 2, 2' and optional scrim layers 3, 3' have a low silicone (i.e. preferably less than 5 wt %, more preferably less than 1 wt % and most preferably substantially free of silicone) content and epoxy binders can be used in this application, but any suitable binder system is contemplated.

Where the mica paper sheets 2, 2' and optional scrim layers 3, 3' are adhesively bonded to the inorganic fibre core 1, any suitable adhesive may be used. Good results have been obtained with a binder comprising acrylic ester copolymer, salified alkyl ether sulfosuccinate and polyoxyethylene alkyl ether.

The sealant 5 may be of any material capable of performing the function of sealing the edges of the inorganic fibre core 1. Typical materials include polymeric materials, but also include inorganic materials (for example colloidal inorganic materials, including (for example) silica sols, alumina sols).

The protective coat 6 surrounds at least the edges of the laminate of inorganic fibre core 1 and mica paper sheets 2, 2' and may (as shown) cover the entirety of the laminate. Suitable materials include polymeric coatings applied and cured in place (e.g. synthetic rubbers) or may comprise polymeric sheets heat laminated to the laminate of inorganic fibre core 1 and mica paper sheets 2, 2'. Vacuum encapsulation (for example with high density polyethylene [HDPE]) is a convenient method.

The materials of the invention may be used as they are, or in combination with materials such as metals to provide a heat spreading effect to limit "hot spots". Heat conductive layers (such as metal foils or meshes) may be provided as part of the composite for the same purpose.

Typical requirements for suitability for use as insulation against thermal runaway in lithium ion battery assemblies include the ability to withstand 600° C. for 10 minutes; and on exposure to 600° C. on one side, having a temperature of no more than 120° C. on the reverse side after 10 minutes and preferably after 20 minutes.

This was tested by subjecting one side of a number of samples to 600° C. using a heat gun, and measuring temperature with a thermocouple disposed on the hot side, and with two spaced thermocouples on the cold side, one being adjacent the sample, and the other spaced 30 mm from the sample.

EXAMPLES

Figure 5:
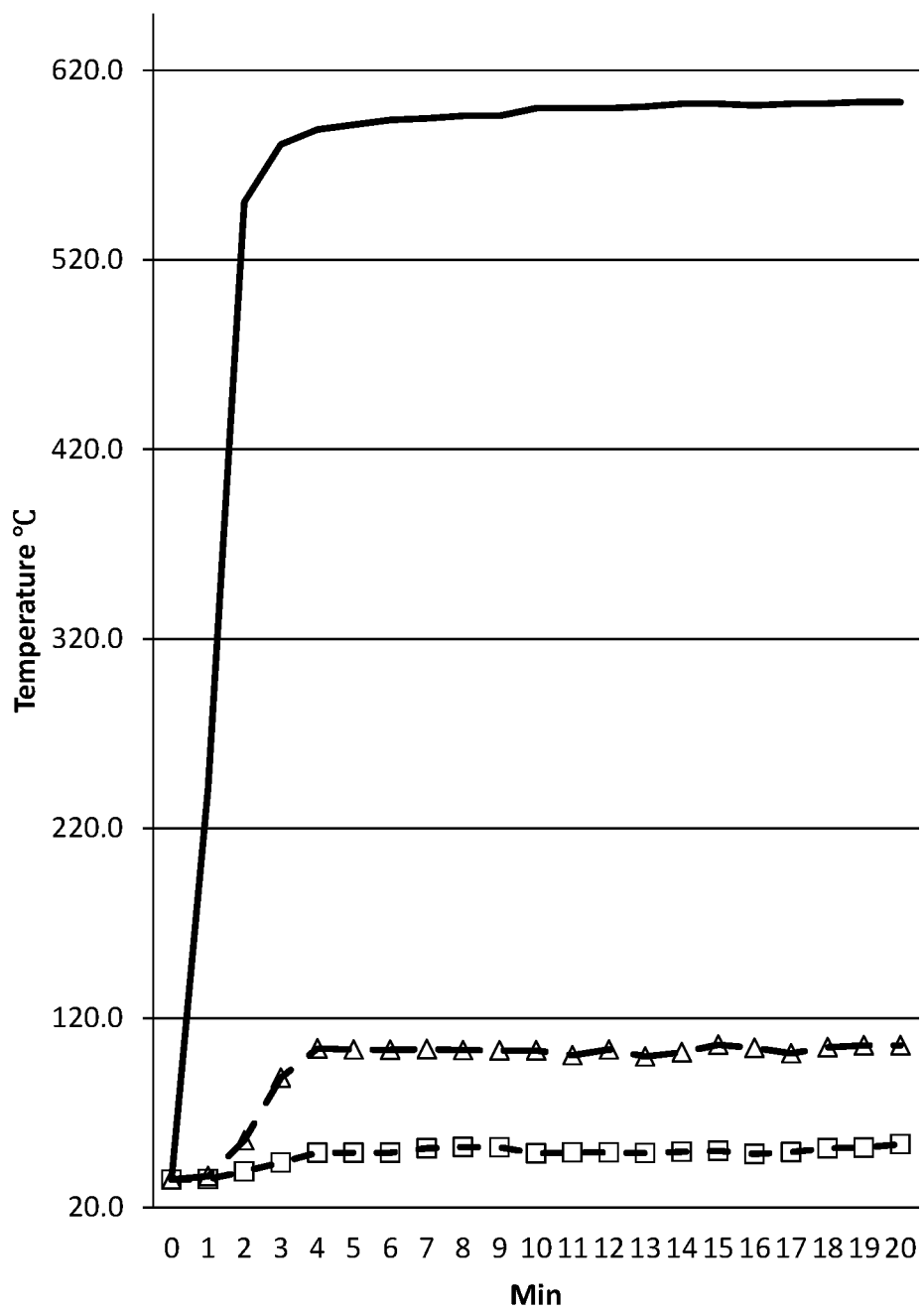
FIG. 5 shows the results of a test on heat resistance of a material usable in the first, second and third embodiments.

Example 1 comprised an inorganic fibre core of 6 mm thick SUPERWOOL® PLUS alkaline earth silicate paper, adhesively laminated between sheets of 0.1 mm thick mica/ glass cloth paper from SWECO Inc. FIG. 5, shows a temperature time plot with the solid line indicating the hot face temperature and the other lines indicating the temperature adjacent A and spaced from □ the sample. As can be seen this material meets the requirement of the temperature on the cold face not reaching 120° C. after 10 minutes exposure. Appropriate impregnation of the edges, and/or coating the inorganic fibre core provides a barrier integral to the material to hinder ingress of humidity to edges of the inorganic fibre core and will result in a material that not only meets the thermal requirement but also guards against attack by humidity.

The moisture uptake of the sealed inorganic core was tested by first subjecting the sample to a salt spray conditions in accordance with ASTM B117 (Standard Practice for Operating Salt Spray (Fog) Apparatus); salt solution: 5 wt % NaCl; Temperature 35° C.; 1 hour duration using Temperature and Humidity Chamber (JEIO TECH co./TH-ME-065). The samples were then dried for 24 hours at room temperature before putting the sample in the Temperature and Humidity Chamber at 40° C., 95% relative humidity for 23 hours. After drying at room temperature of 24 hours, the moisture uptake of the sample was calculated 2.23 wt % (average of three samples).

Figure 6:
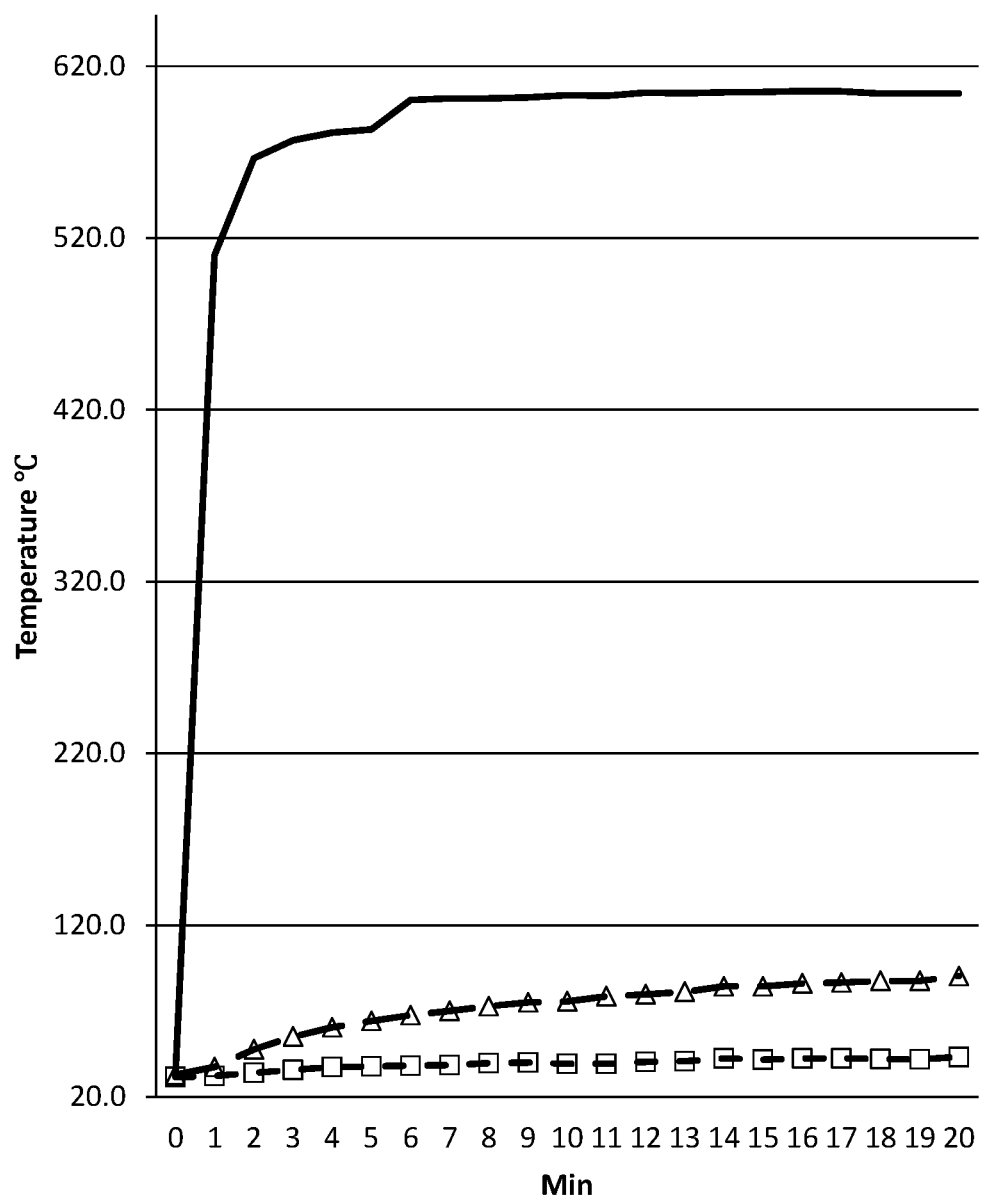
FIG. 6 shows the results of a test on heat resistance of a material usable in the first, second and third embodiments.

Example 2 comprised a 3 mm thick SUPERWOOL® PLUS alkaline earth silicate paper adhesively laminated between sheets of 0.1 mm thick mica/glass cloth paper from SWECO Inc. The laminate of alkaline earth silicate paper and mica/glass cloth paper was secured to a 3 mm thick aluminium plate. FIG. 6 shows a temperature time plot with the solid line indicating the hot face temperature and the other lines indicating the temperature adjacent A and spaced from □ the sample. As can be seen this material meets the requirement of the temperature on the cold face not reaching 120° C. after 10 minutes exposure and indeed shows temperatures below those of Example 1. However the compressibility of this material is less than that of Example 1; and inclusion of metal adds a conductive layer, and so is not necessarily preferred. However the provision of an aluminium plate provides greater rigidity and heat spreading that may be useful in some applications.

Uses

The present invention provides a range of composite materials that may be either compressible and resilient, or relatively rigid, and that having low through-material electrical conductivity, that are resistant to humidity; and that optionally have a low silicone content.

The composite materials may be used in electric power assemblies to protect cells against thermal runaway, or in other applications where fire protection is required.

Variants

The above examples use mica paper. The mica group of minerals are sheet silicates (phyllosilicates) comprising a number of minerals (e.g. Biotite, Muscovite, Phlogopite, Lepidolite, Margarite, Glauconite). Other sheet silicates show similar insulative effects (e.g. vermiculite). The present invention is not limited to mica insulation but extends also to insulation comprising other sheet silicates.

In addition, the above examples use phyllosilicate insulation in paper form, but the insulation need not be in the form of paper and may comprise a coating resulting from painting, spraying, or otherwise applying a suspension comprising (optionally with other ingredients) one or more phyllosilicate minerals to the surface of the inorganic fibre core. Such a coating may further constitute the, or part of the, barrier hindering ingress of humidity to edges of the inorganic fibre core.

The above examples use an inorganic fibre core in the form of a paper of alkaline earth silicate fibres. The inorganic fibre core need not comprise such fibres and any suitable fibre may be used.

The invention claimed is:

1. An electrical storage device comprising:
a plurality of cells or batteries and a composite material, the composite material comprising:
an inorganic fibre core comprising inorganic fibres interlocked or entangled to form a coherent body resistant against separation laminated between at least two layers of phyllosilicate insulation, the composite material further comprising a barrier integral to the material to hinder ingress of humidity to edges of the inorganic fibre core, the composite material configured to insulate and provide fire protection for the plurality of cells or batteries.

2. The electrical storage device as claimed in claim 1, wherein the barrier to the composite material to hinder ingress of humidity comprises a sealant impregnated into edges of the inorganic fibre core.

3. The electrical storage device as claimed in claim 2, wherein the sealant comprises a material selected from the group consisting of polymeric materials, inorganic materials, and mixtures thereof.

4. The electrical storage device as claimed in claim 3, wherein the inorganic materials comprise colloidal inorganic materials.

5. The electrical storage device as claimed in claim 1, wherein the barrier to the composite material to hinder ingress of humidity further comprises a protective coat adhering to at least the edges of the laminate of the inorganic fibre core and the at least two layers of phyllosilicate insulation.

6. The electrical storage device as claimed in claim 5, wherein the protective coat surrounds and encapsulates the entirety of the laminate of the inorganic fibre core and the at least two layers phyllosilicate insulation.

7. The electrical storage device as claimed in claim 5, wherein the protective coating comprises a polymeric coating.

8. The electrical storage device as claimed in claim 7, wherein the polymeric coating comprises polymeric sheets heat laminated to the laminate of the inorganic fibre core and the at least two layers of phyllosilicate insulation.

9. The electrical storage device as claimed in claim 1, wherein the inorganic fibre core comprises at least 90% by weight the inorganic fibres.

10. The electrical storage device as claimed in claim 1, wherein the inorganic fibre core comprises a paper formed from the inorganic fibres which comprise alkaline earth silicate fibres.

11. A composite material, as claimed in claim 1, in which the inorganic fibre core has a thickness greater than 0.5 mm.

12. The electrical storage device as claimed claim 1, wherein the inorganic fibre core has a thickness less than 10 cm.

13. The electrical storage device as claimed in claim 1, wherein the at least two phyllosilicate insulation each comprises a mica paper secured to a backing.

14. The electrical storage device as claimed in claim 9, wherein the backing is a scrim or a glass cloth.

15. The electrical storage device as claimed in claim 1, wherein one of the at least two layers of phyllosilicate insulation has a thickness between 0.06 mm and 0.25 mm.

16. The electrical storage device as claimed in claim 15, wherein one or more layer of phyllosilicate insulation has a thickness in the range 0.08 mm to 0.15 mm.

17. The electrical storage device as claimed in claim 1, wherein on exposure to 600° C. for 10 minutes on an outer surface of one of the layers of phyllosilicate insulation, an outer surface on an opposing layer of phyllosilicate insulation has a temperature of no more than 120° C.

18. The electrical storage device as claimed in claim 17, wherein on exposure to 600° C. for 20 minutes on an outer surface of one of the layers of phyllosilicate insulation, an outer surface on an opposing layer of phyllosilicate insulation has a temperature of no more than 120° C.

19. The electrical storage device comprising the plurality of cells or batteries, of which, at least some are separated by the composite material as claimed in claim 1.

20. An electrical storage device comprising:
a plurality of cells or batteries and a composite material comprising:
an inorganic fibre core comprising inorganic fibres interlocked or entangled to form a coherent body having edges, resistant against separation, laminated between at least two layers of phyllosilicate insulation, the composite material further comprising a barrier integral to the composite material to hinder egress of humidity to, and sealing the edges of the inorganic fibre core, the composite material configured to insulate and provide fire protection for the plurality of cells or batteries.

\* \* \* \* \*